United States Patent
Wong

(10) Patent No.: US 8,205,209 B2
(45) Date of Patent: Jun. 19, 2012

(54) SELECTING A NUMBER OF PROCESSING RESOURCES TO RUN AN APPLICATION EFFECTIVELY WHILE SAVING POWER

(75) Inventor: Peter W. Y. Wong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 12/050,336

(22) Filed: Mar. 18, 2008

(65) Prior Publication Data

US 2009/0241122 A1    Sep. 24, 2009

(51) Int. Cl.
G06F 9/46 (2006.01)
(52) U.S. Cl. .......................... 718/104; 718/102; 718/105
(58) Field of Classification Search ................... 718/102, 718/104, 108
See application file for complete search history.

(56) References Cited

U.S. PATENT DOCUMENTS

| | | | | |
|---|---|---|---|---|
| 5,958,058 | A * | 9/1999 | Barrus | 713/320 |
| 6,622,252 | B1 | 9/2003 | Klaassen et al. | |
| 6,829,713 | B2 * | 12/2004 | Cooper et al. | 713/320 |
| 6,938,249 | B2 * | 8/2005 | Roediger et al. | 717/160 |
| 7,086,043 | B2 * | 8/2006 | Roediger et al. | 717/150 |
| 7,093,147 | B2 * | 8/2006 | Farkas et al. | 713/320 |
| 7,174,471 | B2 | 2/2007 | Komarla et al. | |
| 7,222,269 | B2 * | 5/2007 | Kurinami et al. | 714/47.1 |
| 7,577,943 | B2 * | 8/2009 | Chilimbi et al. | 717/130 |
| 7,587,709 | B2 * | 9/2009 | Chilimbi et al. | 717/130 |
| 7,596,709 | B2 * | 9/2009 | Cooper et al. | 713/323 |
| 7,603,257 | B1 * | 10/2009 | Warren | 702/186 |
| 7,703,079 | B1 * | 4/2010 | Burrows et al. | 717/127 |
| 7,831,325 | B1 * | 11/2010 | Zhang et al. | 700/108 |
| 2003/0177241 | A1 * | 9/2003 | Katayama | 709/226 |
| 2005/0108587 | A1 * | 5/2005 | Cooper et al. | 713/320 |
| 2007/0179676 | A1 * | 8/2007 | Sasaki et al. | 700/295 |
| 2007/0245294 | A1 * | 10/2007 | Saito et al. | 717/100 |
| 2009/0178032 | A1 * | 7/2009 | Yang et al. | 717/151 |

OTHER PUBLICATIONS

Haines et al., "Semicustom Design With a Microcontroller Core", VLSI Systems Design, vol. VII, No. 12, Dec. 1986, pp. 26-29.
Elnozahy et al., "A Survery of Rollback-Recovery Protocols in Message-Passing Systems", ACM Computing Surveys, vol. 34, No. 3, Sep. 2002, pp. 375-408.
Wolf et al., "SmartPointers" Personalized Scientific Data Portals In Your Hand, IEEE, 2002, pp. 1-16.
O'Hara et al., "Microsoft Windows CE: A New Handheld Computing Platform", ACM, 1997, pp. 295-296.
Lee et al., "Mitigating Soft Error Failures for Multimedia Applications by Selective Data Protection", ACM, CAES'06, Oct. 23-25, 2006, pp. 411-420.

* cited by examiner

Primary Examiner — Aimee Li
(74) Attorney, Agent, or Firm — Francis Lammes; Stephen J. Walder, Jr.; Steven L. Bennett

(57) ABSTRACT

Selecting a number of processors to run an application in order to save power is performed. A number of code segments are selected from an application. Each of the code segments are executed using two or more of a plurality of processing resource combinations. Each of the code segments are scored with a performance value. The performance value indicates a performance of each code segment using each of the two or more processing resource combinations. A selection is made of one of the two or more processing resource combinations based on an associated performance value and a number of processing resources used to execute the code segment. The application is then executed using the selected processing resource combination.

17 Claims, 5 Drawing Sheets

| | CODE SEGMENT | CODE SEGMENT | CODE SEGMENT |
|---|---|---|---|
| EIGHT PROCESSORS | 20 | 18 | 20 |
| FOUR PROCESSORS | 19 | 20 | 16 |
| TWO PROCESSORS | 19 | 17 | 12 |

SELECTING A NUMBER OF PROCESSING RESOURCES TO RUN AN APPLICATION EFFECTIVELY WHILE SAVING POWER

BACKGROUND OF THE INVENTION

1. Field of the Invention

The present application relates generally to an improved data processing system and method. More specifically, the present application is directed to selecting a number of processors to run an application effectively while saving power.

2. Background of the Invention

Most modern data processing systems consume power whether they are running a computational intensive application or are mostly idle. While power conservation may be a concern in today's society, many data processing system users are more concerned with performance over power consumption. In order to improve the performance of a data processing system, some of the most popular programming techniques make use of multiple processors to achieve higher throughput. Very often, operating systems and/or applications will make use of all the processors, physical and logical, on a data processing system to hopefully achieve the best performance of the data processing system. However, while making use of all of the processing resources of a data processing system may result in the best performance of the system in some cases, there are other cases where using all of the processing resources of a data processing system is not as advantageous.

BRIEF SUMMARY OF THE INVENTION

In one illustrative embodiment, a method, in a data processing system, is provided for selecting a number of processors to run an application in order to save power. The illustrative embodiments sample a number of code segments from the application. The illustrative embodiments execute each of the code segments using two or more of a plurality of processing resource combinations. The illustrative embodiments score each of the code segments with a performance value. In the illustrative embodiments, the performance value indicates a performance of each code segment using each of the two or more processing resource combinations. The illustrative embodiments select one of the two or more processing resource combinations based on an associated performance value and a number of processing resources used to execute the code segment. The illustrative embodiments then execute the application using the selected processing resource combination.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
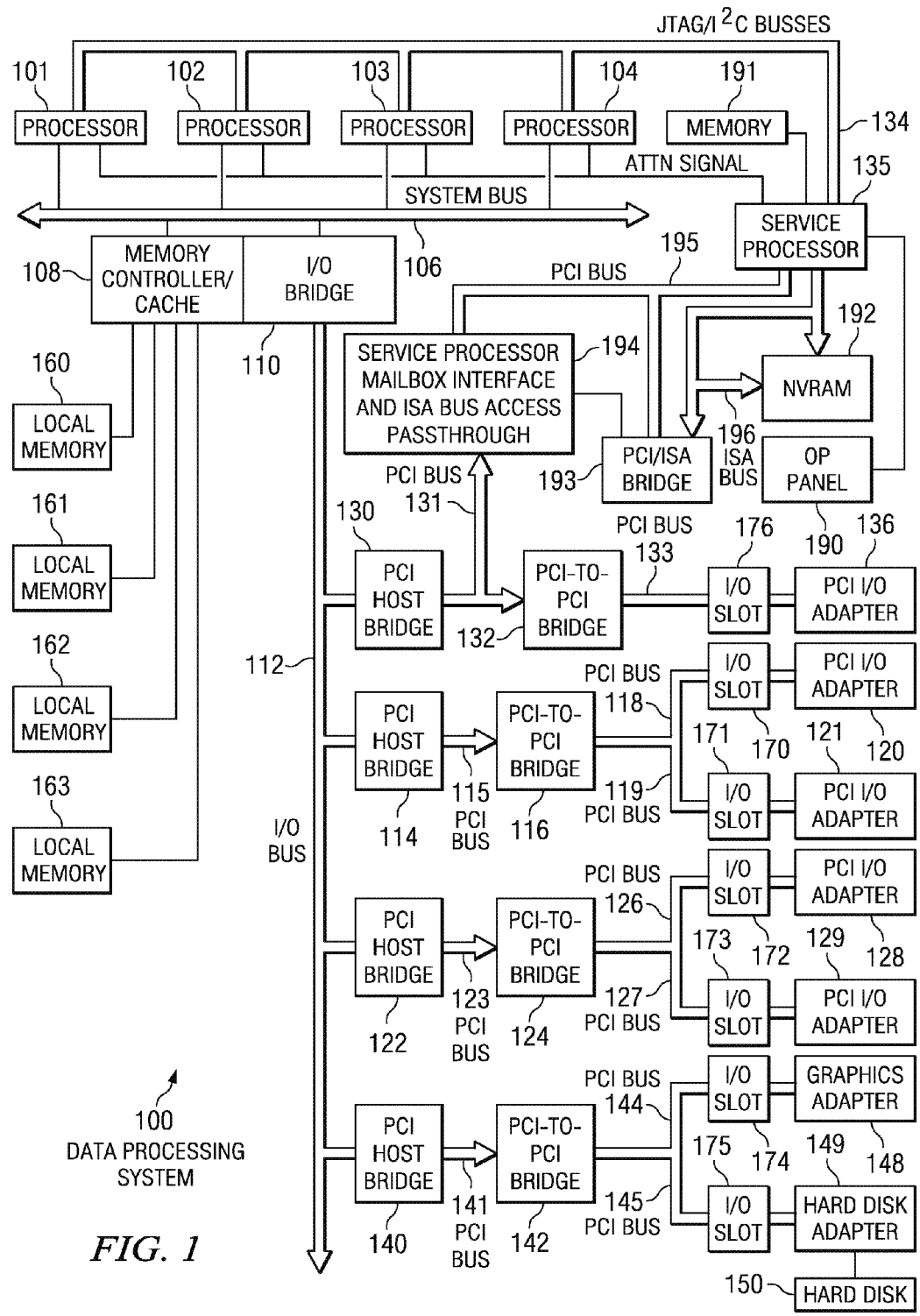
FIG. 1 depicts an exemplary block diagram of a data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
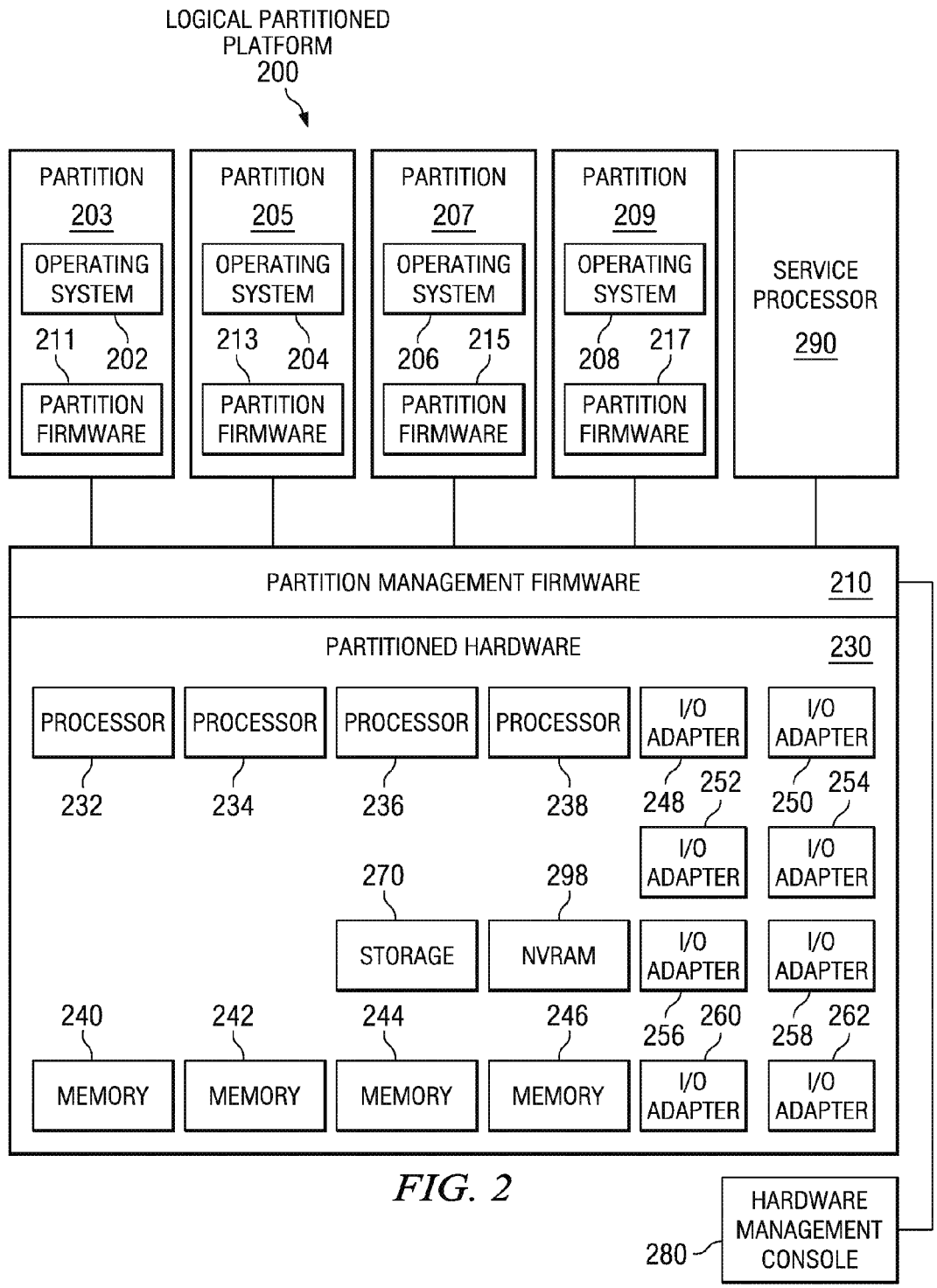
FIG. 2 depicts a block diagram of an exemplary logically partitioned platform in which the illustrative embodiments may be implemented.

The illustrative embodiments provide mechanisms for determining performance levels for various combinations of processing resources for running an application and selecting a combination of processing resources to run an application effectively while saving power. As such, the mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts an exemplary block diagram of a data processing system in which the illustrative embodiments may be implemented. Data processing system 100 may be a symmetric multiprocessor (SMP) system, or a heterogeneous multiprocessor system, including a plurality of processors 101, 102, 103, and 104 connected to system bus 106. For example, data processing system 100 may be an IBM® eServer™, a product of International Business Machines Corporation of Armonk, N.Y., implemented as a server within a network. Moreover, data processing system 100 may be a Cell Broadband Engine (CBE) data processing system, another product of International Business Machines Corporation. Alternatively, a single processor system may be employed.

Also connected to system bus 106 is memory controller/cache 108, which provides an interface to a plurality of local memories 160-163. Input/Output (I/O) bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149, or individual functions of any of the above adapters, may be assigned to different logical partitions (LPARs). In this case, graphics adapter 148 provides a connection for a display device (not shown), while hard disk adapter 149 provides a connection to control hard disk 150.

Thus, for example, assume data processing system 100 is divided into three logical partitions, P1, P2, and P3. Each of PCI I/O adapters 120-121, 128-129, 136, graphics adapter 148, hard disk adapter 149, or individual functions of any of the above adapters, each of host processors 101-104, and memory from local memories 160-163 are assigned to the three partitions.

In these examples, local memories 160-163 may take the form of dual in-line memory modules (DIMMs). The DIMMs are not normally assigned on a per DIMM basis to the partitions but rather, a partition will be assigned a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. For example, one instance of the Advanced Interactive Executive (AIX®) operating system may be executing within partition P1, a second instance (image) of the AIX® operating system may be executing within partition P2, and a Linux® or OS/400 operating system may be operating within logical partition P3.

Peripheral component interconnect (PCI) host bridge 114, connected to I/O bus 112, provides an interface to PCI local bus 115. A number of PCI input/output adapters 120-121 may be connected to PCI bus 115 through PCI-to-PCI bridge 116, the PCI bus 118, the PCI bus 119, the I/O slot 170, and the I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices.

An additional PCI host bridge 122, connected to I/O bus 112, provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128 and 129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141, and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

PCI host bridge 130 provides an interface for PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus 131 also connects PCI host bridge 130 to service processor mailbox interface and ISA bus access passthrough logic 194. Service processor mailbox interface and ISA bus access passthrough logic 194 forwards PCI accesses destined to PCI/ISA bridge 193. Non-volatile RAM (NVRAM) storage 192 is connected to ISA bus 196.

Service processor 135 is coupled to service processor mailbox interface and ISA bus access passthrough logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of host processors 101, 102, 103, and 104 are connected together to an interrupt input signal of the service processor 135. Service processor 135 has its own local memory 191 and has access to hardware OP-panel 190.

When data processing system 100 is initially powered up, service processor 135 uses JTAG/I$^2$C busses 134 to interrogate the system (host) processors 101-104, memory controller/cache 108, and I/O bridge 110. At completion of this step, service processor 135 has an inventory and topology understanding of the data processing system 100. Service processor 135 also executes Built-In-Self-Tests (BISTs), Basic Assurance Tests (BATs), and memory tests on all elements found by interrogating host processors 101-104, memory controller/cache 108, and I/O bridge 110. Any error information for failures detected during the BISTs, BATs, and memory tests are gathered and reported by the service processor 135.

If a valid configuration of system resources is still possible after taking out the elements found to be faulty during the BISTs, BATs, and memory tests, then data processing system 100 is allowed to proceed to load executable code into the local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, the I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs).

Data processing system 100 may be implemented using various commercially available computer systems. For example, data processing system 100 may be implemented using IBM® eServer™ iSeries® Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments set forth hereafter but is only meant to provide one example of a data processing system in which the exemplary aspects of the illustrative embodiments may be implemented.

With reference now to FIG. 2, a block diagram of an exemplary logically partitioned platform is depicted in which the illustrative embodiments may be implemented. The hardware in the logically partitioned platform 200 may be implemented, for example, using the hardware of the data processing system 100 in FIG. 1.

Logically partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as partition management firmware 210, e.g., a hypervisor. OS/400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform (in this example, partition management firmware 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware 211, 213, 215, and 217. Partition firmware 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by partition management firmware 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Partition management firmware 210 performs a number of functions and services for logical partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of the logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through hardware management console 280. Hardware management console 280 is a separate data processing system from which a system administrator may perform various functions including reallocation of resources to different logical partitions.

The illustrative embodiments provide for a method and system to determine performance levels for various combinations of processing resources for running an application and selecting a combination of processing resources to run an application effectively while saving power. The various combinations of resources that are analyzed by the illustrative embodiments may comprise physical processors, virtual processors, or even one or more cores within a physical processor chip.

Figure 3:
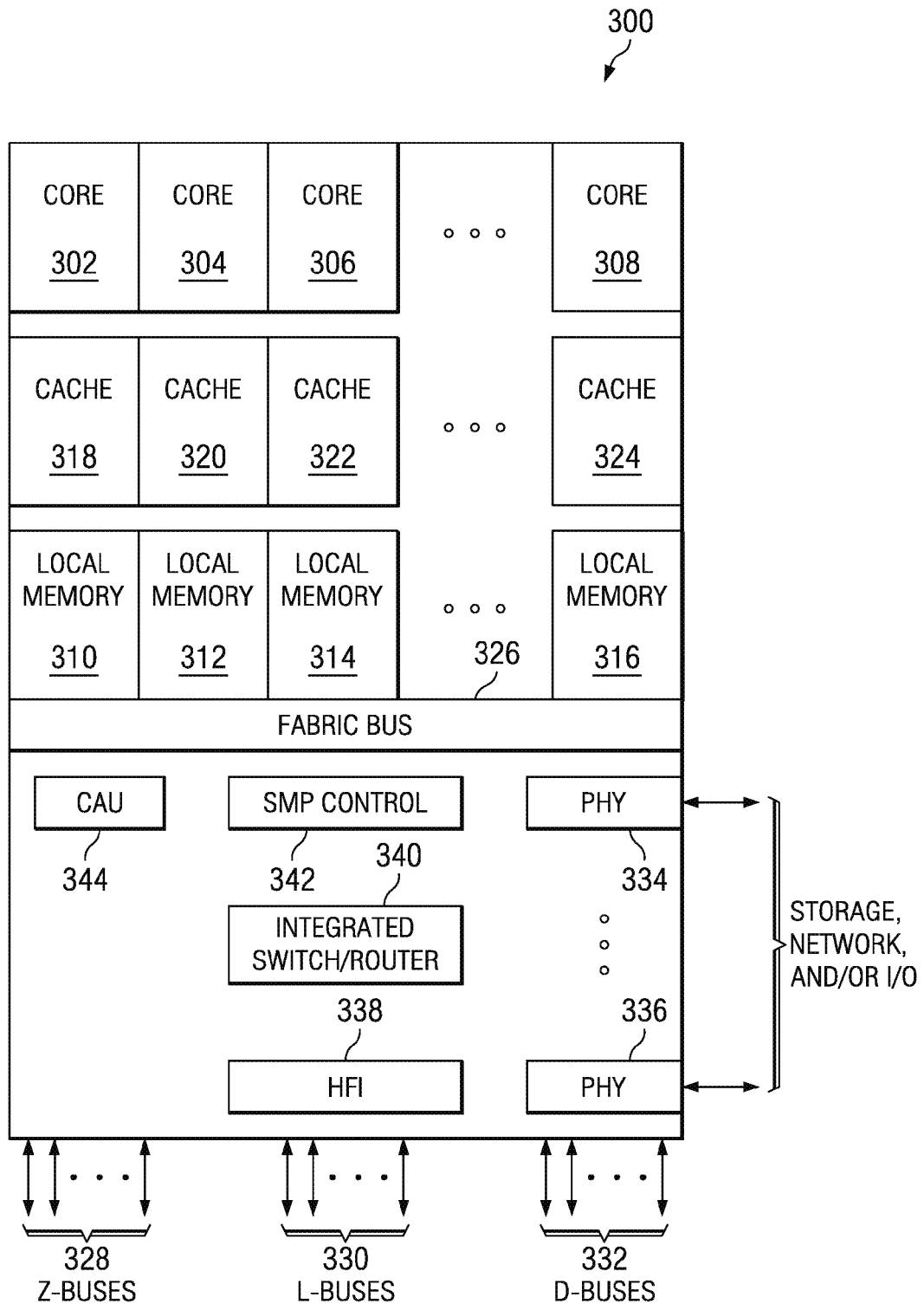
FIG. 3 depicts an exemplary logical view of a processor chip in accordance with one illustrative embodiment.

FIG. 3 depicts an exemplary logical view of a processor chip, which may be a "node" in a data processing system, in accordance with one illustrative embodiment. Processor chip 300 may be a processor chip such as processors 101-104 of FIG. 1 or processors 232-238 of FIG. 2. Processor chip 300 may be logically separated into the following functional components: homogeneous processor cores 302, 304, 306, and 308, and local memory 310, 312, 314, and 316. Although processor cores 302, 304, 306, and 308 and local memory 310, 312, 314, and 316 are shown by example, any type and number of processor cores and local memory may be supported in processor chip 300.

Processor chip 300 may be a system-on-a-chip such that each of the elements depicted in FIG. 3 may be provided on a single microprocessor chip. Moreover, in an alternative embodiment processor chip 300 may be a heterogeneous processing environment in which each of processor cores 302, 304, 306, and 308 may execute different instructions from each of the other processor cores in the system. Moreover, the instruction set for processor cores 302, 304, 306, and 308 may be different from other processor cores, that is, one processor core may execute Reduced Instruction Set Computer (RISC) based instructions while other processor cores execute vectorized instructions. Each of processor cores 302, 304, 306, and 308 in processor chip 300 may also include an associated one of cache 318, 320, 322, or 324 for core storage.

Processor chip 300 may also include an integrated interconnect system indicated as Z-buses 328, L-buses 330, and D-buses 332. Z-buses 328, L-buses 330, and D-buses 332 provide interconnection to other processor chips in a three-tier complete graph structure, which will be described in detail below. The integrated switching and routing provided by interconnecting processor chips using Z-buses 328, L-buses 330, and D-buses 332 allow for network communications to devices using communication protocols, such as a message passing interface (MPI), Open Multi-Processing (OpenMP), or an internet protocol (IP), or using communication paradigms, such as global shared memory, to devices, such as storage, and the like.

Additionally, processor chip 300 implements fabric bus 326 and other I/O structures to facilitate on-chip and external data flow. Fabric bus 326 serves as the primary on-chip bus for processor cores 302, 304, 306, and 308. In addition, fabric bus 326 interfaces to other on-chip interface controllers that are dedicated to off-chip accesses. The on-chip interface controllers may be physical interface macros (PHYs) 334 and 336 that support multiple high-bandwidth interfaces, such as PCIx, Ethernet, memory, storage, and the like. Although PHYs 334 and 336 are shown by example, any type and number of PHYs may be supported in processor chip 300. The specific interface provided by PHY 334 or 336 is selectable, where the other interfaces provided by PHY 334 or 336 are disabled once the specific interface is selected.

Processor chip 300 may also include host fabric interface (HFI) 338 and integrated switch/router (ISR) 340. HFI 338 and ISR 340 comprise a high-performance communication subsystem for an interconnect network, such as network 102 of FIG. 1. Integrating HFI 338 and ISR 340 into processor chip 300 may significantly reduce communication latency and improve performance of parallel applications by drastically reducing adapter overhead. Alternatively, due to various chip integration considerations (such as space and area constraints), HFI 338 and ISR 340 may be located on a separate chip that is connected to the processor chip. HFI 338 and ISR 340 may also be shared by multiple processor chips, permitting a lower cost implementation. Processor chip 300 may also include symmetric multiprocessing (SMP) control 342 and collective acceleration unit (CAU) 344. Alternatively, these SMP control 342 and CAU 344 may also be located on a separate chip that is connected to processor chip 300. SMP control 342 may provide fast performance by making multiple cores available to complete individual processes simultaneously, also known as multiprocessing. Unlike asymmetrical processing, SMP control 342 may assign any idle processor core 302, 304, 306, or 308 to any task and add additional ones of processor core 302, 304, 306, or 308 to improve performance and handle increased loads. CAU 344 controls the implementation of collective operations (collectives), which may encompass a wide range of possible algorithms, topologies, methods, and the like.

HFI 338 acts as the gateway to the interconnect network. In particular, processor core 302, 304, 306, or 308 may access HFI 338 over fabric bus 326 and request HFI 338 to send messages over the interconnect network. HFI 338 composes the message into packets that may be sent over the interconnect network, by adding routing header and other information to the packets. ISR 340 acts as a router in the interconnect network. ISR 340 performs three functions: ISR 340 accepts network packets from HFI 338 that are bound to other destinations, ISR 340 provides HFI 338 with network packets that are bound to be processed by one of processor cores 302, 304, 306, and 308, and ISR 340 routes packets from any of Z-buses 328, L-buses 330, or D-buses 332 to any of Z-buses 328, L-buses 330, or D-buses 332. CAU 344 improves the system performance and the performance of collective operations by carrying out collective operations within the interconnect network, as collective communication packets are sent through the interconnect network. More details on each of these units will be provided further along in this application.

By directly connecting HFI 338 to fabric bus 326, by performing routing operations in an integrated manner through ISR 340, and by accelerating collective operations through CAU 344, processor chip 300 eliminates much of the interconnect protocol overheads and provides applications with improved efficiency, bandwidth, and latency.

It should be appreciated that processor chip 300 shown in FIG. 3 is only exemplary of a processor chip which may be used with the architecture and mechanisms of the illustrative embodiments. Those of ordinary skill in the art are well aware that there are a plethora of different processor chip designs currently available, all of which cannot be detailed herein. Suffice it to say that the mechanisms of the illustrative embodiments are not limited to any one type of processor chip design or arrangement and the illustrative embodiments may be used with any processor chip currently available or which may be developed in the future. FIG. 3 is not intended to be limiting of the scope of the illustrative embodiments but is only provided as exemplary of one type of processor chip that may be used with the mechanisms of the illustrative embodiments.

Figures 4, 5:
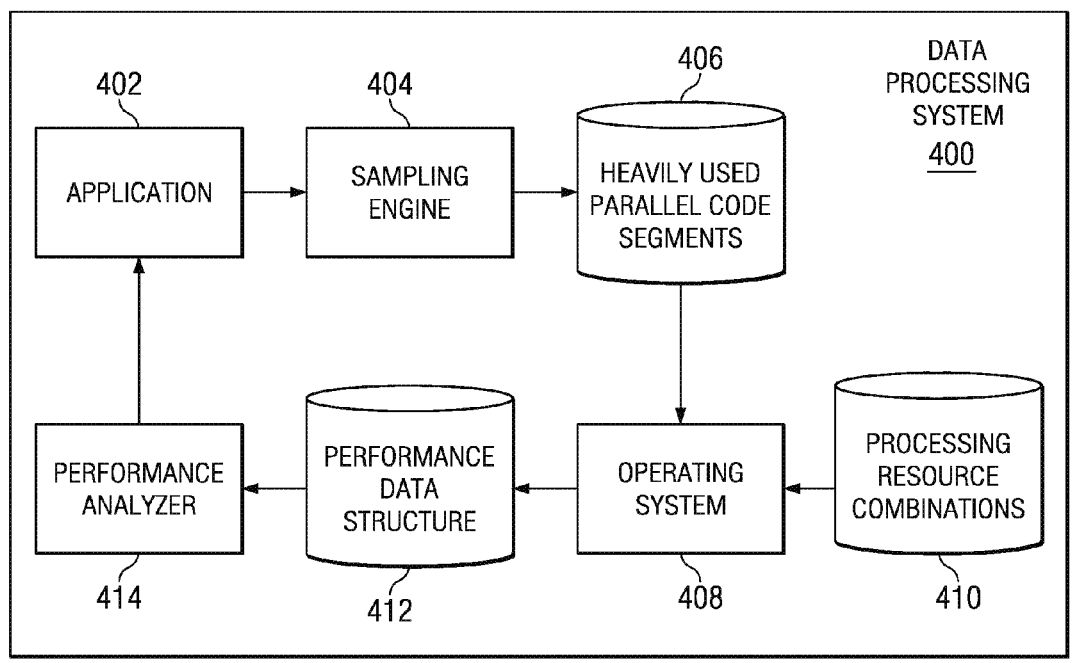
FIG. 4 depicts a functional block diagram of the components used in determining performance levels for various combinations of processing resources for running an application and selecting a combination of processing resources to run an application effectively while saving power in accordance with an illustrative embodiment.
FIG. 5 depicts a table of exemplary results obtained by running code segments against combinations of processing resources in accordance with an illustrative embodiment.

FIG. 4 depicts a functional block diagram of the components used in determining performance levels for various combinations of processing resources for running an application and selecting a combination of processing resources to run an application effectively while saving power in accordance with an illustrative embodiment. When a user of data processing system 400 intends to run application 402 at a reduced power level, sampling engine 404 uses a parallel programming construct, such as OpenMP™, MPI, or the like, to select and sample a number of heavily used parallel code segments 406 from application 402 prior to application 402 being executed by operating system 408. Parallel code segments may be those code segments that are divided into a number of pieces and processed by a number of threads in parallel by a number of physical and/or logical processors. Determining which parallel code segments are heavily used may be predefined by the owner of the code who has a thorough understanding of the code or through an analysis of the code during previous runs from which heavily used parallel code segments may be identified.

Once sampling engine 404 collects heavily used parallel code segments 406 from application 402, heavily used parallel code segments 406 are passed to operating system 408 to be executed using two or more of processing resource combinations 410. Processing resource combinations 410 contains a list of processing resource combinations that are predetermined by the user, which in most cases is a system administrator. The user may identify any number of processing resource combinations 410. For example, if the data processing system has four physical processors, then the user may have processing resource combinations 410 that include four physical processors, three physical processors, two physical processors, or even one physical processor. If hyperthreading, multithreading, or the like is used, then the user may have processing resource combinations 410 that include eight logical processors, six logical processors, four logical processors, or even two logical processors. Therefore, there may be so many processing resource combinations available in the data processing system that the user may only specify a few processing resource combinations 410 available for running an application.

As operating system 408 runs heavily used parallel code segments 406 using each of the two or more processing resource combinations 410, operating system 408 gives a score to each parallel code segment within heavily used parallel code segments 406. The score given to each parallel code segment may be based on a metric associated with each individual parallel code segment, such as floating-point operations per second (FLOPS), elapsed time for processing the code segment, or any other benchmark measurement for rating the speed of the processing resource combination. The scores are recorded in performance data structure 412. Once each of heavily used parallel code segments 406 have been run against each of the two or more processing resource combinations 410 predetermined by the user, performance analyzer 414 identifies the combination of processing resources that provide the best performance to the user for each parallel code segment and those combinations of processing resources that have a performance within an acceptable performance level, for example, within a percentage of the best performing combination of processing resources. Based on the accepted performance level, performance analyzer 414 may select the identified combination of processing resources that uses the fewest processing resources to run the application. Performance analyzer 414 then passes the selected combination of processing resources to application 402, so that when application 402 is executed by operating system 408, application 402 is executed using the selected combination of processing resources.

FIG. 5 depicts a table of exemplary results obtained by running code segments against combinations of processing resources in accordance with an illustrative embodiment. As shown in table 500, combination of processing resources 502 comprises eight processors 504, four processors 506, and two processors 508. Again, the combination of processing resources is exemplary and any combination of processing resources may be used without departing from the spirit and scope of the present invention. In this example, the acceptable performance level is at least 90% of the best. In table 500, code segments 510, 512, and 514 have been executed using each of combination of processing resources 502. For code segment 510, while eight processors 504 provides the best performance of executing code segment 510, two processors 508 may be used to execute code segment 510 since two processors 508 achieves at least 90% of the best performance and uses the fewest processing resources and, thus, saves power by allowing the other processing resources to be placed into a hibernation state or similar state that saves power.

For code segment 512, four processors 506 provide better performance than eight processors 504, so eight processors 504 should not be used. Two processors 508 do not achieve the acceptable performance level, which is at least 90% of the best performance. Therefore, four processors 506 should be used to process code segment 512, because four processors 506 saves power by allowing the other processing resources to be placed into a hibernation state or similar state that saves power. For code segment 514, eight processors 504 provides the best performance of executing code segment 514 and, since four processors 506 and two processors 508 do not achieve the acceptable performance level, code segment 514 should be executed by eight processors 504 and no power will be saved.

Figure 6:
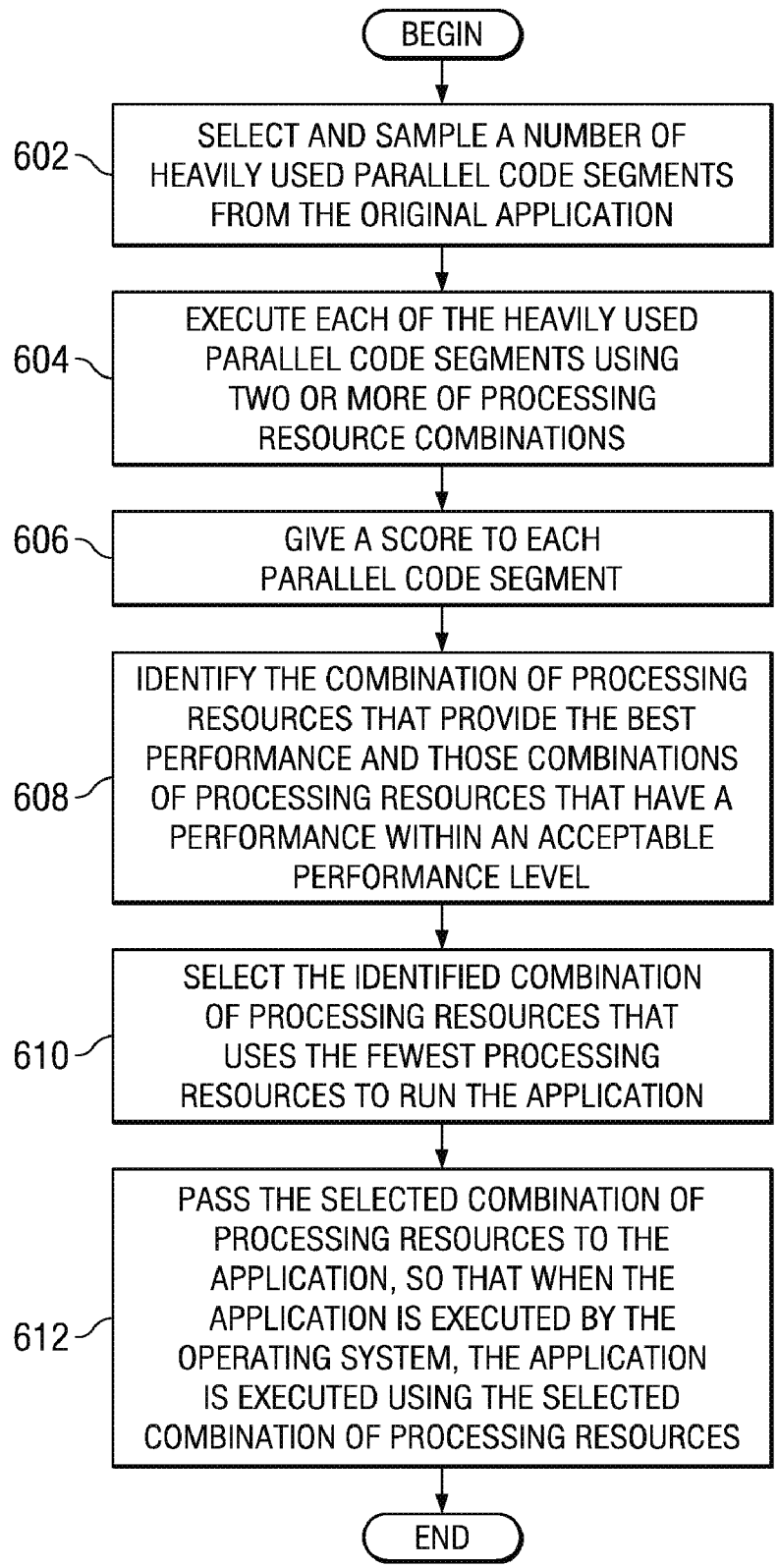
FIG. 6 illustrates an exemplary operation of determining performance levels for various combinations of processing resources for running an application and selecting a combination of processing resources to run an application effectively while saving power in accordance with an illustrative embodiment.

FIG. 6 illustrates an exemplary operation of determining performance levels for various combinations of processing resources for running an application and selecting a combination of processing resources to run an application effectively while saving power in accordance with an illustrative embodiment. As the operation begins, a sampling engine uses a parallel programming construct to select and sample a number of heavily used parallel code segments from an application prior to the application being executed by an operating system (step 602). Once the sampling engine collects the heavily used parallel code segments from the application, the operating system executes each of the heavily used parallel code segments using two or more of the processing resource combinations (step 604). As the operating system runs each of the heavily used parallel code segments using each of the two or more processing resource combinations, the operating system gives a score to each parallel code segment (step 606), which are recorded in a performance data structure.

Once each of heavily used parallel code segments have been run against each of the two or more processing resource combinations, a performance analyzer identifies the combination of processing resources that provide the best performance for each parallel code segment and those combinations of processing resources that have a performance within an acceptable performance level (step 608). Based on the accepted performance level, the performance analyzer selects the identified combination of processing resources that uses the fewest processing resources to run the application (step 610). The performance analyzer then passes the selected combination of processing resources to the application, so that when the application is executed by the operating system, the application is executed using the selected combination of processing resources (step 612), with the operation ending thereafter.

Thus, the illustrative embodiments provide for determining performance levels for various combinations of processing resources for running an application and selecting a combination of processing resources to run an application effectively while saving power in accordance with an illustrative embodiment. A number of code segments are sampled from the application and executed by the operating system using combinations of processing resources. A performance value is given to each of the code segments that indicates a performance of each code segment using each of the combination of processing resources. One of the combinations of processing resources that has associated performance value within a predetermined performance level and uses minimal processing resources to run the application is identified. Then the application is executed using the identified combination of processing resources.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for selecting a number of processors to run an application in order to save power, the method comprising:
sampling a number of heavily used parallel code segments from the application;
executing each of the heavily used parallel code segments using two or more of a plurality of processing resource combinations;
scoring each of the heavily used parallel code segments with a performance value, wherein the performance value indicates a performance of each heavily used parallel code segment using each of the two or more processing resource combinations;
selecting one of the two or more processing resource combinations based on an associated performance value and a number of processing resources used to execute the heavily used parallel code segment; and
executing the application using the selected processing resource combination.

2. The method of claim 1, wherein the performance of each heavily used parallel code segment is a benchmark measurement that rates the speed at which the processing resource combination executes the heavily used parallel code segment.

3. The method of claim 1, wherein the associated performance value is within a predetermined performance level and wherein the predetermined performance level is within a predetermined percentage of a highest performance value of each heavily used parallel code segment.

4. The method of claim 1, wherein the plurality of processing resource combinations comprises at least one of two or more physical processors, two or more logical processors, or a combination of physical processors and logical processors.

5. The method of claim 4, wherein each processor in the two or more physical processors comprises a plurality of cores.

6. The method of claim 5, wherein the plurality of cores are homogeneous.

7. The method of claim 5, wherein the plurality of cores are heterogeneous.

8. The method of claim 1, wherein sampling the number of heavily used parallel code segments from the application is performed prior to the application being executed by an operating system.

9. The method of claim 1, wherein the plurality of processing resource combinations are predetermined by a user.

10. A computer program product comprising a computer recordable medium having a computer readable program recorded thereon, wherein the computer readable program, when executed on a computing device, causes the computing device to:
sample a number of heavily used parallel code segments from the application;
execute each of the heavily used parallel code segments using two or more of a plurality of processing resource combinations;
score each of the heavily used parallel code segments with a performance value, wherein the performance value indicates a performance of each heavily used parallel code segment using each of the two or more processing resource combinations;
select one of the two or more processing resource combinations based on an associated performance value and a number of processing resources used to execute the heavily used parallel code segment; and
execute the application using the selected processing resource combination.

11. The computer program product of claim 10, wherein the performance of each heavily used parallel code segment is a benchmark measurement that rates the speed at which the processing resource combination executes the heavily used parallel code segment.

12. The computer program product of claim 10, wherein the associated performance value is within a predetermined performance level and wherein the predetermined performance level is within a predetermined percentage of a highest performance value of each heavily used parallel code segment.

13. The computer program product of claim 10, wherein the computer readable program to sample the number of heavily used parallel code segments from the application is performed prior to the application being executed by an operating system.

14. An, apparatus, comprising:
a processor; and
a memory coupled to the processor, wherein the memory comprises instructions which, when executed by the processor, cause the processor to:
sample a number of heavily used parallel code segments from the application;
execute each of the heavily used parallel code segments using two or more of a plurality of processing resource combinations;
score each of the heavily used parallel code segments with a performance value, wherein the performance value indicates a performance of each heavily used parallel code segment using each of the two or more processing resource combinations;
select one of the two or more processing resource combinations based on an associated performance value and a number of processing resources used to execute the heavily used parallel code segment; and
execute the application using the selected processing resource combination.

15. The apparatus of claim 14, wherein the performance of each heavily used parallel code segment is a benchmark measurement that rates the speed at which the processing resource combination executes the heavily used parallel code segment.

16. The apparatus of claim. 14, wherein the associated performance value is within a predetermined performance level and wherein the predetermined performance level is within a predetermined percentage of a highest performance value of each heavily used parallel code segment.

17. The apparatus of claim 14, wherein the instructions to sample the number of heavily used parallel code segments from the application are performed prior to the application being executed by an operating system.

* * * * *